L. M. ASPINWALL & G. BRIGHT.
RECORDING APPARATUS.
APPLICATION FILED APR. 10, 1908.
1,056,878.
Patented Mar. 25, 1913.
2 SHEETS—SHEET 1.
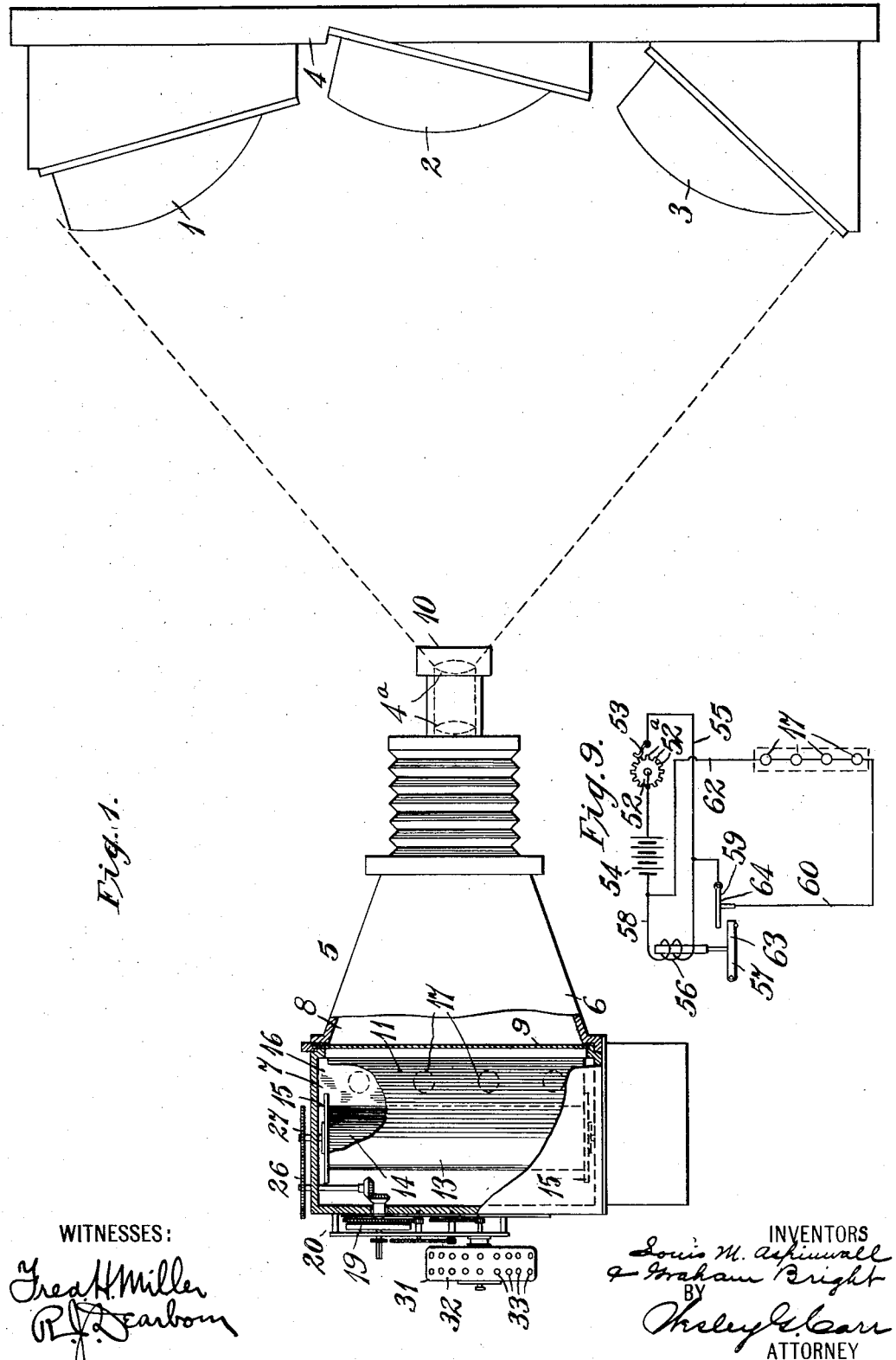
WITNESSES:
INVENTORS
ATTORNEY L. M. ASPINWALL & G. BRIGHT.
RECORDING APPARATUS.
APPLICATION FILED APR. 10, 1908.
1,056,878.
Patented Mar. 25, 1913.
2 SHEETS—SHEET 2.
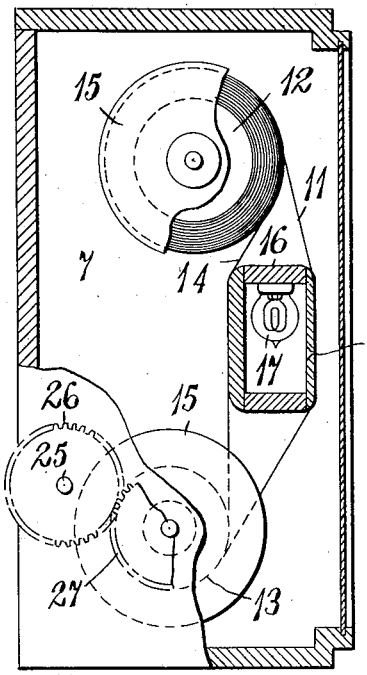
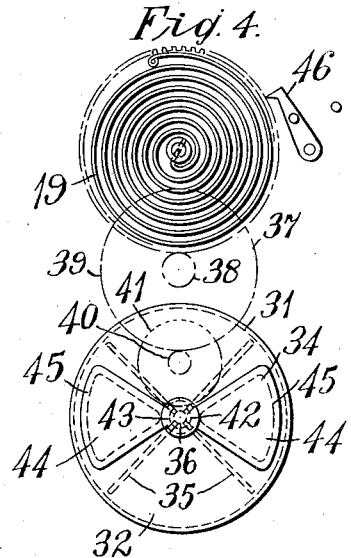
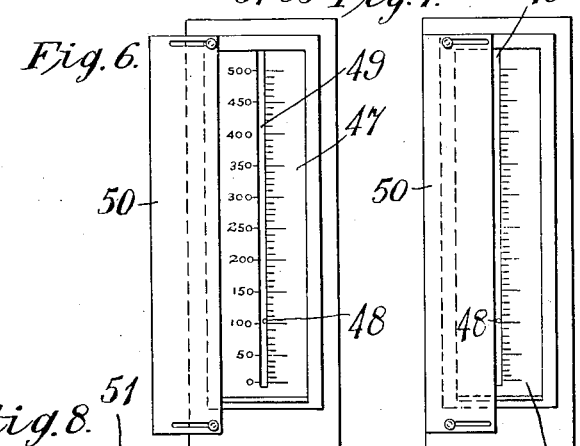
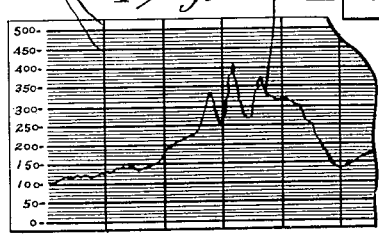
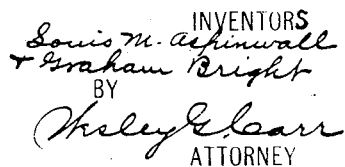
WITNESSES:
Fred H Miller
R J Dearborn
INVENTORS
Louis M. Aspinwall
& Graham Bright
BY
Wesley G Carr
ATTORNEY

UNITED STATES PATENT OFFICE.

LOUIS M. ASPINWALL AND GRAHAM BRIGHT, OF WILKINSBURG, PENNSYLVANIA, ASSIGNORS, BY MESNE ASSIGNMENTS, TO WESTINGHOUSE ELECTRIC & MANUFACTURING COMPANY, OF EAST PITTSBURGH, PENNSYLVANIA, A CORPORATION OF PENNSYLVANIA.

RECORDING APPARATUS.

1,056,878.      Specification of Letters Patent.      Patented Mar. 25, 1913.

Application filed April 10, 1908. Serial No. 426,359.

*To all whom it may concern:*

Be it known that we, LOUIS M. ASPINWALL and GRAHAM BRIGHT, citizens of the United States, and residents of Wilkinsburg, in the county of Allegheny and State of Pennsylvania, have invented a new and useful Improvement in Recording Apparatus, of which the following is a specification.

Our invention relates to means and apparatus for continuously recording the readings of indicating meters and similar devices.

One object of our invention is to provide a simple and efficient device whereby a continuous record of the readings of one or more indicating meters or measuring instruments may be simultaneously obtained at a relatively small expense.

Another object of our invention is to provide means, in a device of the class above indicated, for producing true rectilinear coordinates, one of which shall mark time intervals and the other the divisions on the dials of the meters, concurrently with the production of the pointer or indicator records on the record sheet.

In the design and improvement of electrical apparatus, it is specially desirable to obtain continuous records of the performance of similar electrical apparatus already constructed and in service. For example, it is often found advantageous to run tests on electric cars and locomotives in order to obtain accurate indications or records of the speed, voltage applied, the amount of current traversing the motor circuits and the true energy consumed for a given period of time. In the prior art, recording instruments have been constructed, but they are very expensive and delicate and introduce considerable resistance to the action of the meter mechanism and, furthermore, they are not adapted for service tests under conditions such as those referred to above. Moreover, none of these instruments are provided with means for producing true time coordinates on the record sheet while the meter readings are being recorded.

According to our present invention, we provide means for obtaining an accurate record of the indications of one or more indicating meters of a well known type without interfering with the normal utilities of the meter or meters.

Our improved device comprises, in general, a camera which is specially adapted for producing a continuous film record of the readings of one or more external measuring instruments, means being provided for producing a thin cross line at predetermined intervals of time and adjustable means being provided for regulating the speed at which the recording film is moved past the area to which light is admitted and on which the image of the external objects is cast.

Various other novel features are contained in our improved device, but these will be pointed out more fully in the remainder of the specification and in the appended claims.

Our invention is illustrated in the accompanying drawings, in which—

Figure 1 is a side elevation, with certain of the parts broken away to disclose the operating mechanism, of a device constructed in accordance therewith together with a plurality of indicating meters for which a continuous record is desired. Fig. 2 is a view similar to that of Fig. 1, but on a larger scale, of the operating mechanism, film carriers and the inclosing casing which constitute the major portion of our improved device. Fig. 3 is a plan view of the device shown in Fig. 2, certain of the parts being shown in cross-section. Fig. 4 is a detail view illustrating the adjusting means for regulating the speed of the operating mechanism, and Fig. 5 is a detail view of an automatic flashing device that is adapted to produce the suitable time coördinates which appear at intervals in the completed records. Figs. 6 and 7 are front elevations of a single edgewise measuring instrument the scale of which is vertically disposed, the calibrating numerals being exposed in Fig. 6 and covered in Fig. 7. Fig. 8 is a portion of a record sheet which may be produced by our improved recording apparatus. Fig. 9 is a diagram of one portion of the mechanism and its controlling circuits.

Measuring instruments having the general form shown in Figs. 1, 6, and 7 are ordinarily known as instruments of the edgewise type, are best adapted for use in connection with our recording device, since the divisions on the dial plate are spaced at substantially equal distances apart and are parallel to each other so that they may be readily and indefinitely elongated in the final record without producing inaccuracies or confusion. Inasmuch as the structure of the instrument forms no part of our present invention and since it may be responsive to variations in electric elements or the pressures or flows of fluids such as water, gas and steam, we deem it unnecessary to describe or illustrate the meter mechanism. The form of meter which we prefer to employ is illustrated and described in Patent No. 529,433, granted November 20, 1894, to J. Van Vleck.

Referring to the drawings, a plurality of indicating meters 1, 2, and 3, for which a continuous record is desired, are mounted on a plate or slab 4 in such a manner that they are at substantially equal distances from the lenses 4ª of a recording camera 5. The recording camera comprises an inclosing casing 6 which is divided into two chambers 7 and 8 by an opaque slide or plate 9. The chamber 8 is provided with an opening 10 in which suitable lenses are mounted for admitting light to the chamber and for casting an image on a sensitized strip or film 11 which is wound from a roll or reel 12 onto a second roll or reel 13, both rolls being contained in the chamber 7 and rotatably supported by its walls. The sensitized strip or film 11 is protected by a strip 14 of dead black paper or other fabric in a well known manner and both of the rolls 12 and 13 are provided with end flanges 15 which guide the strips as they move from the one to the other. The sensitized film is separated from the opaque strip 14 between the two rolls by means of a box 16 which is in the form of a hollow rectangular prism and is provided with a plurality of small incandescent lights 17 and with a longitudinal slot 18 over which the film 11 is drawn.

The roll 13 is driven by a main spring 19 which acts through a gear mechanism 20 comprising a spring box 21 to which the outer extremity of the spring is secured, a shaft 22, bevel gears 23 and 24, an auxiliary shaft 25 and spur gears 26 and 27, the inner end of the spring being secured to a winding shaft 28 that is provided with a ratchet 29 and an engaging pawl 30. The gear mechanism comprises a well known arrangement ordinarily found in watches and clocks, the usual balance mechanism being omitted and a rotary dash-pot 31 being employed for retarding the movement of the driving mechanism in order to effect a smooth and continuous operation of the film.

The rotary dash-pot 31 comprises a stationary cylindrical casing 32 having a plurality of peripheral openings 33 and an adjustable damper 34 at one side, vanes 35 rotatably mounted on a shaft 36 within the casing and concentric with it and a driving mechanism 37 which comprises a plurality of reduction gears 38, 39, 40, 41, and 42 that are interposed between the toothed periphery of the spring box 21 and the shaft 36 on which the gear wheel 42 is mounted.

The damper 34 may, of course, be of any suitable form and, as illustrated in Fig. 4, it comprises a hub member 43 having a pair of wing projections 44 which may cover, to a greater or less degree, openings 45 in the side of the dash-pot casing.

Assuming that the spring 19 is wound, the mechanism may be started by releasing a pawl 46 from the periphery of the spring box 21 and stopped by moving it into engagement therewith.

Each of the indicating instruments 1, 2, and 3 is provided with a dial 47 similar to that shown in Figs. 6 and 7, and an indicating pointer 48, which forms a part of the meter mechanism, protrudes through a slot 49 in the dial. The calibrating numerals are disposed at one side of the slot 49 and may be covered by an adjustable strip 50 in order that the record may not be blurred by the numerals when the meter face is photographed on a moving film. In order to obtain the desired result, it will be essential to make the entire face of the instrument dead black with the exception of the divisions on the dial and the tip of the pointer, the latter being preferably in the form of a polished spherical surface of very small radius.

Assuming that no use is made of the incandescent lights contained in the box 16 (which we prefer to designate as a flasher, for convenience), the operation of the device is as follows: The camera 5 is first focused on the instruments 1, 2, and 3 and the film is temporarily exposed while it is still stationary and the calibrating numerals are uncovered, as shown in Fig. 6. In this way, a negative of the calibrating numerals, together with the divisions of the dial, is formed which constitutes the begining of the record, as shown in Fig. 8. If more than one instrument is photographed as is indicated in Fig. 1 the film or strip used will, of course, be of a sufficient width to record the complete dial of each instrument, one above the other, so that the meter records will not conflict. After this exposure light is excluded from the film and the slides 50 are moved so as to cover the numerals as shown in Fig. 7. The test run is then commenced and the instruments are connected in their proper relations. The film may then be again exposed and the driving mechanism for the rolls released, the speed being regulated by the rotary dash-pot 31. The reproduced divisions on the dial will, of course, be elongated and will constitute longitudinal lines on the record, the smaller divisions being indicated by fine lines and the major divisions by wider lines. The pointer 48 will be constantly changing position according to the variations in the elements measured by the meter and, consequently, a continuous irregular line, such as the line 51 in Fig. 8, will be produced. It will, of course, be understood that the record of Fig. 8 is only a portion of the complete record which would be produced when three instruments are photographed, the number of instruments being immaterial, since it is possible to take a record of one or more, according to the requirements of any given test.

In addition to the longitudinal lines, produced as above indicated, it is desirable to have equal time intervals indicated on the record by cross lines and, although the speed at which the film travels may be kept substantially constant, it is, of course, impossible to keep the speed absolutely constant, and, consequently, the cross lines indicating equal time intervals can not be accurately laid off by dividers after the record is complete. The flasher comprising the box 16 and its contents, together with a control mechanism, is intended for the purpose of producing fine cross lines with accuracy and precision which shall be indicative of equal time intervals on the completed record. The circuit connections of this mechanism are illustrated in Fig. 9, and the operation of the flasher and the circuit connections of its controller may be described and traced, as follows: A contact-bearing wheel 52 is driven by a clock mechanism (a portion only of which is illustrated) and the contact members 52ª of the wheel are equally spaced and are adapted to be engaged by a stationary contact arm 53. . The number of these contact members determines the time interval between the actuations of the flasher. Assuming that one of the contact members has moved into engagement with the contact arm, two circuits are instantly established, one from a battery 54 through the movable and stationary contact members, a conductor 55, the winding 56 of a relay switch 57, and a conductor 58 to the negative battery terminal, and the other from the conductor 55, through a switch 59, a conductor 60, incandescent lamps 17 and a conductor 62 to the negative battery terminal. The completion of the circuit through the lamps will obviously produce a flash of light inside of the box 16, but the actuation of the relay switch 59 will immediately interrupt the light circuit and extinguish the lights, since the movable member 63 of the relay is adapted to engage the movable switch arm 64 of the switch 59 and to move it to its open-circuit position. As soon as the contact-bearing wheel 52 rotates through a sufficient angle to separate the stationary and movable contact members, the relay switch and the other movable parts will resume their original positions so that the operation may be repeated when the next contact member on the wheel comes into engagement with the stationary arm. The flash of light which occurs within the box 16 acts directly upon the film 11 that is passing over the slot 18 and serves to produce a cross line which forms one coördinate of the completed record. These cross lines are designated by a reference character 65 on the record sheet illustrated in Fig. 8.

Various structural modifications may evidently be effected within the spirit and scope of our invention, and we desire that only such limitations shall be imposed as are indicated in the appended claims.

We claim as our invention:

1. The combination with a sensitized strip or film, a casing having an opening for the admission of light to the strip or film, a lamp within the casing and a lens for casting an image of external objects on the strip, of a spring-actuated means for gradually moving or feeding the length of the strip past the opening in the casing, a rotary dash pot for regulating the movement of the strip and means for intermittently energizing the lamp to flash light onto the strip.

2. The combination with a sensitized strip or film, rolls or reels therefor, a casing having an opening for the admission of light to the film, and a lens in the opening for casting an image of external objects on the film, of a clock mechanism for driving the rolls to gradually feed the film past the opening in the casing, an adjustable rotary dash pot for retarding and regulating the movement of the film, and means for intermittently flashing a cross line of light onto the film.

3. The combination with a camera having a sensitized strip or film and rolls or reels therefor, of adjustable rotary retarding means for producing an even, continuous movement of the film, and internal means for intermittently producing a cross line of light on the film.

4. The combination with a camera having rolls or reels, a sensitized film wound thereon, an inclosing casing and an opening for the admission of light to the film, of an inner chamber having a slot over which the film is passed and means within the inner chamber for intermittently producing a flash of light.

5. The combination with a camera having a pair of rolls or reels, a sensitized strip or film wound thereon, a hollow box or casing within the main casing having a longitudinal slot over which the film is drawn, and means within the inner casing for producing intermittent flashes of light.

6. The combination with a sensitized strip or film, rolls or reels therefor, a casing for the rolls and films having an opening for the admission of light to the film, and a lens in the opening for casting an image of external objects on the film, of a clock mechanism for driving the rolls to feed the film past the opening, and a relatively small hollow box or inner casing having a longitudinal slot over which the film is drawn in passing from one reel to the other, and means for intermittently producing a flash of light within the inner casing.

7. The combination with a camera having a casing, a sensitized element, an opening for the admission of external light and means for continuously moving said element, of independent internal means for intermittently flashing a line of light across the element to produce a plurality of fine parallel cross lines thereon.

8. The combination with a camera having a casing, a sensitized element, and means for continuously moving said element to produce a record of changes in an external object, of means for governing the speed of the movable element, a lamp within the casing, an opaque wall having a slit interposed between the lamp and the sensitive element, and means for intermittently energizing the lamp to flash light through said slit upon said element to produce fine cross lines thereon.

9. In photographic apparatus, the combination with a casing having an opening to admit external light, a pair of reels or rolls, a sensitized strip or film wound thereon, automatic means for transferring the film from one roll to the other within the casing, and an inner box having a slot over which the film is passed in moving from one roll to the other, light-producing means within the box, and automatic means for actuating said light-producing means at predetermined time intervals.

10. In photographic apparatus, the combination with a pair of reels or rolls, a sensitized strip or film wound thereon, a spring driving mechanism for transferring the film from one roll to the other, and adjustable means for automatically retarding the movement of the driving mechanism and regulating its speed, of internal means comprising a hollow box having a lineal slot substantially parallel to the axes of the rolls, over which the film is passed in moving from one roll to the other, lamps within the box, and automatic means for actuating said lamps at predetermined time intervals to produce relatively fine cross lines on the film or strip without interfering with the normal photographic record of the apparatus.

11. In photographic apparatus, the combination with a pair of reels or rolls, a sensitized strip or film wound thereon, and automatic means for transferring the strip from one roll to the other, of internal means comprising a box having a lineal slot substantially parallel to the axes of the rolls, over which the film is passed in moving from one roll to the other, electric lamps within the box, and automatic means for supplying energy to the lamps at predetermined intervals of time.

12. In photographic apparatus, the combination with a casing having an opening for the admission of light from an external source, reels or rolls disposed in the casing, a sensitized strip or film and a protecting strip wound together on said reels or rolls and a box having a lineal slot, disposed between the rolls, of means for transferring the two strips from one roll to another on opposite sides of the box.

13. In photographic apparatus, the combination with a casing having an opening for the admission of light from an external source, reels or rolls disposed in the casing, a sensitized strip or film and a protecting strip wound together on said reels or rolls and a box having a lineal slot, disposed between the rolls, and an intermittently energized source of light within the box, of means for transferring the two strips from one roll to another on opposite sides of the box, whereby the sensitized strip is influenced by the source of light within the box independently of the external source.

In testimony whereof, we have hereunto subscribed our names this 28th day of March, 1908.

LOUIS M. ASPINWALL.
GRAHAM BRIGHT.

Witnesses:
HOWARD L. BEACH,
BIRNEY HINES.